US005382412A

United States Patent [19]
Kim et al.

[11] Patent Number: 5,382,412
[45] Date of Patent: Jan. 17, 1995

[54] FLUIDIZED BED REACTOR HEATED BY MICROWAVES

[75] Inventors: Hee Y. Kim; Yong M. Song; Jong Y. Jeon; Dae H. Kwon; Kang M. Lee; Jae S. Lee; Dong S. Park, all of Daejeon, Rep. of Korea

[73] Assignee: Korea Research Institute of Chemical Technology, Daejeon, Rep. of Korea

[21] Appl. No.: 55,239

[22] Filed: Apr. 28, 1993

Related U.S. Application Data

[63] Continuation-in-part of Ser. No. 967,100, Oct. 27, 1992, abandoned.

[51] Int. Cl.⁶ .......................... F27B 15/14; B01J 8/26; B01J 8/42
[52] U.S. Cl. .................................. 422/142; 118/50.1; 118/620; 118/DIG. 5; 219/686; 219/687; 422/141; 422/146; 422/199; 423/349; 423/350
[58] Field of Search ........ 422/146, 142, 141, 198–199; 165/104.16; 427/213; 219/10.55 R, 10.55 F, 10.55 M; 423/349, 350, DIG. 16; 118/50.1, 620, DIG. 5

[56] References Cited

U.S. PATENT DOCUMENTS

| | | | |
|---|---|---|---|
| 2,472,502 | 6/1949 | Tyson | 422/144 |
| 2,488,029 | 11/1949 | Scheineman | 422/141 X |
| 3,236,607 | 2/1966 | Porter, Jr. et al. | 422/141 |
| 4,338,283 | 7/1982 | Sakamoto et al. | 422/112 |
| 4,786,477 | 11/1988 | Yoon et al. | 422/146 X |
| 4,992,245 | 2/1991 | Van Slooten et al. | 165/104.16 |
| 5,073,349 | 12/1991 | Herbst et al. | 422/144 |

OTHER PUBLICATIONS

Handbook of Powder Science and Technology, Eds. by M. E. Fayed and L. Otten, Van Nostrand Reinhold Co., Inc., 1984, p. 529, FIG. 11.23.
Proceedings of the 4th International Conference on Fluidization, May 29–Jun. 3, 1983, Eds. by D. Kunii and R. Toei, pp. 664–665, p. 669, FIG. 1.
Gas-Liquid-Solid Fluidization Engineering, L-S Fan, Butterworth Publishers, 1989, Ch. 6, pp. 383–403 and 518–519.

*Primary Examiner*—Amalia L. Santiago
*Attorney, Agent, or Firm*—Jordan and Hamburg

[57] ABSTRACT

An improved reactor for a high-temperature deposition reaction on seed particles is constructed with a fluidized bed which is divided into a heating zone and a reaction zone by a partition. Seed particles in the heating zone are fluidized by a carrier gas and are heated by microwaves. On the other hand, the reaction zone for the deposition reaction, through which reaction gases pass, is heated by particle mixing between the reaction zone and the upper section of the heating zone. Subsequently, a desired reaction temperature at the reaction zone is maintained stable without deteriorating the microwave heating of the heating zone.

7 Claims, 4 Drawing Sheets

FLUIDIZED BED REACTOR HEATED BY MICROWAVES

This is a continuation-in-part of Ser. No. 07/967,100, filed Oct. 27, 1992 now abandoned.

BACKGROUND OF THE INVENTION

1. Field of the Invention

This invention relates in general to an improved use of microwave irradiation for heating fluidized bed reactors. In a more particular aspect, it relates to an improved apparatus and process of microwave heating for producing polycrystalline silicon utilizing a fluidized bed in which silicon source gas is thermally decomposed or reduced to deposit silicon on silicon particles.

2. Description of the Prior Art

High-purity silicon with a polycrystalline structure (i.e., "polycrystalline silicon" or "polysilicon"), which is a base material for semiconductor devices and solar cells, is produced by thermal decomposition or hydrogen reduction of silicon source gas. This process is called chemical vapor deposition (CVD). Throughout the world, semiconductor grade polysilicon has been produced by the Siemens reactor. In that batchwise CVD reactor, slim rods of polysilicon are heated by electric current, and the heated rods are exposed to a gaseous mixture of hydrogen and silicon source gas. Recently, attempts have been made to use fluidized beds as an improved CVD reactor system for the bulk production of the high-purity silicon. Fluidized bed reactors are a useful means for the high exposure of solid surfaces to the reactant gases, which provides economy of operation. If a silicon source gas is passed through a fluidized bed of polysilicon particles, abbreviated as "silicon particles" hereinafter, elementary is silicon deposited on their surfaces, and thus the particles grow in size. In addition, another outstanding feature of the fluidized bed system is that the polysilicon product is obtained in the form of granules that are approximately spherical. Being free flowing, this granular polysilicon is transported and handled readily, while rod-like product from the Siemens reactor has to be broken into chunks for transforming polysilicon into single crystal by the Czochralski method. Therefore, the granular polysilicon is essential to the continuous growth of single crystal by a modified Czochralski puller.

Use of the fluidized bed reactor is not without problems in spite of its advantages. When fluidized beds are used for the production of polysilicon, silicon particles in the bed are vulnerable to the agglomeration or sintering of particles due to prolonged contact between them, effectively glued together by the silicon being deposited on their surfaces at a high temperature of about 1000° C. The agglomerated or sintered particles can be grown into clusters that have tendency to settle to the bottom of the fluidizing bed. Then, difficulties in operation are encountered and effective surface areas for silicon deposition are greatly reduced. This problem is deeply related with particle size and temperature. According to the Geldart's classification of particles (see Kunii and Levenspiel, Fluidization Engineering, 2nd ed., Butterworth-Heinemann, 1991, pp. 75-79), the agglomeration or sintering is prominent in fluidizing fine particles (Group C), and can greatly be reduced with increasing particle size above about 40 microns. If fluidizing particles are larger than about 100 microns (classified as Group B or D particles), interparticle cohesive forces are negligible when compared with viscous forces exerted on the particles by fluidizing gas. Thus, the prolonged contact between silicon particles is expected to be prevented by the increase of particle size as well as by proper reactor design to distribute fluidizing gas uniformly. On the other hand, sintering of such silicon particles should be more related with temperature. In a publication (Ceramic Fabrication Processes, ed. W. D. Kingery, MIT Press, Cambridge, Mass., 1958, pp. 120-131) the temperature dependence of the rate of sintering in ceramics, K, is described to be significant as $K_\chi \exp[-Q/RT]$ where Q, R and T are the energy of activation, the gas law constant and temperature, respectively. In addition, the temperature dependence of the rate of silicon deposition is of the same form. Consequently, the contact of silicon particles to and the silicon deposition near reactor walls maintained over the required CVD temperature should lead to more probable bridging between particles, together .with the reinforcement by silicon deposition at the bridges, then to a pendular state of agglomerated particles and finally to the formation of clusters. In case of heating reactor walls by resistance heaters, which has been widely used, the walls are inevitably the hottest area within the reactor. Therefore, the silicon deposition near the hot reactor walls is not recommendable in preventing the problem of particle sintering.

Using resistance heaters for fluidized bed CVD reactor also causes the problems of heavy wall deposition, contamination of polysilicon product, and difficulties in material selection and reactor design. To maintain the deposition temperature within the fluidized bed of silicon particles, the reactor wall should be heated much higher than the deposition temperature if the resistance heaters are used around the wall. Then, the rate of the silicon deposition onto the inner wall of the reactor is faster than that onto silicon granules due to the high temperature dependence of silicon deposition. This process cannot therefore be carried out continuously but has to be terminated periodically for replacing or cleaning the reactor wall. Moreover, when using a quartz reactor that is one of the most recommendable material for producing high-purity silicon, the reactor becomes very susceptible to thermal shock because of the extremely large difference between the thermal expansion of the quartz reactor wall and that of the silicon layer deposited thereon. Then, the heavy wall deposition usually results in that the quartz reactor breaks during cooling before cleaning or may even break earlier. Use of a graphite liner, the interior wall which is coated with silicon carbide by an initial silicon deposition reaction, inside a reactor chamber was also proposed to prevent wall breakage (see U.S. Pat. No. 4,092,446). Because silicon and silicon carbide are similar in thermal expansion, the liner can effectively be used for prolonged CVD operation. However, the silicon product from this kind of reactor would not be free from the contamination of carbon impurity. Furthermore, accumulation of heavy silicon deposition on the liner wall should obviously entail the periodic interruption of the CVD operation. Therefore, an efficient method for heating the fluidized bed other than the wall heating is required to use effectively a fluidized bed reactor for producing polysilicon granules. Heating of the silicon particles may be carried out by means of electrodes installed within the fluidized bed or by continuously circulating the particles through a reactor and through a separate heater. These heating methods involve the use of complicated additional apparatus within the fluidized bed itself and/or involve the continuous circulation of the silicon particles into and out of the reactor, and thus they increase the complexity in design and operation. Furthermore, the increase of contact between silicon particles and the surfaces of the electrode wall or of the separate heater with the required piping for particle circulation should apparently lead to the increase of contamination with impurity in the silicon product.

To minimize the problem related with wall heating, a recirculating fluidized bed reactor was proposed as discussed in U.S. Pat. Nos. 4,416,913 and 4,992,245 and Japanese Pat. KOKAI No. 2-30611 (1990). The reactor is characterized by peripheral heating zone annulus containing downwardly flowing silicon particles, which are heated by outer heating zone wall, i.e., the reactor wall, and are then transferred to an inner reaction zone. The particles enter the heating zone annulus at an upper inlet and exit the annulus at a lower outlet. The CVD reaction mainly proceeds in the inner reaction zone through which a silicon source gas rises upwardly. The mass flow rate of falling particles through the heating zone and the temperature difference between the outer annulus wall and these particles should be high enough to supply the required heat to the annulus. It is then difficult to supply upwardly sufficient amount of a carrier gas such as hydrogen for preventing leakage of the silicon source gas from the reaction zone through both ends of the heating zone, while maintaining the high downward mass flow of the silicon particles to be heated in the heating zone. The flow rate of the carrier gas would be at most that required for the incipient fluidization of the falling particles. Thus, the introduction of the silicon source entrained with the falling silicon particles and its gaseous diffusion from the reaction zone into the annular space cannot avoided by such amount of uprising carrier gas. Although the amount of the silicon source entrained into the heating zone is not significant, a fraction of it should naturally be decomposed to silicon on the outer annulus walls which must be considerably hotter than the particles. Therefore, the proposed circulation reactor can reduce but cannot prevent the problem of the deposition at the outer annulus wall heated outside. Besides, the convective heat swept and lost by the carrier gas uprising the heating zone is considerable. It is also required to employ some type of driving force such as a pulsed gas jet to promote the introduction of the heated particles from the lower outlet of the heating zone to inside the reaction zone. Then, the heat loss due to the carrier gas and the pulsed gas jet should be made up by increasing the wall temperature. The requirements of the high temperature at the reactor wall and the low degree of fluidization within the heating zone can yield the agglomeration of particles near the heated walls. In addition, due to the lower outlet of the heating zone, the gas distribution means for introducing a silicon source should always contact with the heated particles. This naturally leads to the deposition of silicon and the formation of crust on the distribution means unless the means is sufficiently cooled below an incipient decomposition temperature of the silicon source. It is apparent that such cooling reduces the heat transfer from the heating zone to the heating zone. Therefore, a need exists for an improved type of the fluidized bed reactor with separated heating zone.

To overcome the disadvantages of supplying heat to the wall of the fluidized bed reactor, it has been proposed to heat silicon particles in a CVD reactor by the irradiation with an electromagnetic wave such as microwaves that cover the range of frequencies from 50 MHz to 300 GHz. Since silicon is a highly microwave absorptive material, the microwave can be used effectively in the fluidized bed CVD process. U.S. Pat. No. 4,416,913 describes a possible use microwave heating to keep silicon particles in a rising particle reaction column hotter than the chamber walls so that CVD on the walls is reduced or avoided. It is recirculating rising particle reactor where arising particle reaction zone column is installed within an annulus reservoir arranged surrounding the reaction column. In this column the gas velocity of silicon source gases must be sufficient to lift, transport, and eject all silicon particles smaller than a predetermined size while those which have grown to a larger size fall through the rising gas stream and are extracted from the base of the reactor. It is notable that the CVD reactor proposed in the patent is not the fluidized bed type reactor in which net solids flow is zero or nearly zero and most of the solid particles fluidized by rising gas bubbles contact with each other. The rising particle reactor is an example of a dilute-phase (or lean-phase) solid-gas system because the volume fraction of solid is much lower than in the dense-phase fluidized bed reactor. The rising particle reactor thus requires excessively high velocity of silicon source gas to overcome gravitational force of silicon particles and to maintain upward solids flow (see Perry et al, "Chemical Engineers' Handbook", 5th Ed., pp 20–64, McGraw-Hill, Inc. 1973). Under such a dilute-phase system the microwave heating of silicon particles is practically difficult due to light loading factor, i.e., low volume fraction of silicon particles (microwave absorptive load). Since most silicon particles are uprising separately from each other, heat transfer by solid-solid contact and by radiation between them is greatly limited in the rising particle reactor. In addition, cooling of the heated particles by the high velocity of silicon source gas also requires high-power microwave energy, because the gas cannot be preheated sufficiently before feeding due to the initiation of CVD within a preheater. Therefore, the feasibility of the microwave heating is not expected in such a dilute-phase CVD system.

More improved use of the microwave heating for the production of polysilicon granules has been disclosed in U.S. Pat. 4,900,411. Following the description in the patent, microwaves are introduced into a lower reaction zone of the fluidized bed reactor. In the reaction zone silicon particles are fluidized by the reaction gas and are heated by direct irradiation of microwaves. Compared with the above-mentioned particle rising reactor, this dense-phase fluidized bed reactor is more effective in microwave heating because of the higher volume fraction of silicon particles and of the lower gas velocity within the reactor. The heating method was observed to keep the reactor walls not hotter than that of silicon particles because quartz is transparent to microwaves in the range of CVD temperature. In spite of these advantages the method includes some undesirable manipulations for CVD reaction that are requisite to the direct irradiation of microwaves into the reaction zone. When microwaves penetrate into the reaction zone through quartz reactor walls, the silicon particles next to the walls absorb most of the microwave energy because the penetration depth of microwaves decreases with temperature. Thus, the inner walls of the quartz reactor in direct contact with the irradiated silicon particles should be kept as hot as these particles. Therefore silicon deposition on the inner walls by the reaction gas occurs with the same rate as on heated silicon particles. If the silicon layer deposited on the walls through which microwaves penetrate becomes sufficiently thick, the layer itself would absorb most of the microwave energy. This would lead to accumulation of heat inside the irradiated layer and then to an accelerated temperature increase even above the melting temperature of silicon. In this case the advantage of microwave heating vanishes. To prevent this problem the referenced patent describes a gas cooling outside the reactor wall without disturbing the microwave irradiation into the reaction zone. It also describes that such a wall cooling is important in CVD operations at 700° C. if monosilane is used as a silicon source gas. However, such wall cooling naturally increases heat loss and thus requires high microwave power to maintain the reaction temperature. In addition, insulation surrounding the reactor walls is impossible. Thus, the gas cooling greatly increases power consumption, and reduces the feasibility of microwave heating. If CVD operations are executed with trichlorosilane as a silicon source gas at above 900° C, the wall deposition should become more probable in spite of cooling the reactor walls. This is attributed to the characteristics that: trichlorosilane can be decomposed to silicon both on the microwave irradiated silicon particles and on the reactor wall unless the wall is cooled under 400° C. without any selectivity for the temperature of solid surfaces, while the pyrolysis of silane occurs selectively on hotter silicon particles than on cooled reactor walls. Therefore, gas cooling of the reactor wall should become more serious but difficult in operation with the increase of the reaction temperature. Furthermore, to save energy, insulation around the reactor walls is impossible. Besides the wall cooling, the patent requires cooling a gas distributing means supporting the reaction zone by introducing a coolant fluid into the means to prevent substantial deposition of silicon on it. Then, the referenced CVD process is shown to be based on simultaneous heating and cooling of the reaction zone, i.e., direct microwave heating of the reaction zone together with cooling by coolant fluids of the solid surfaces encompassing the reactor, which reduces the effect of microwave heating and increases energy consumption as well as difficulties in operation.

SUMMARY OF THE INVENTION

This invention is an improved apparatus for providing an efficient temperature profile within a fluidized bed reactor and makes it greatly effective to heat the reactor by microwave. The improved apparatus provides a fluidized bed reactor containing a heating zone that is located below the upper level of a reaction zone. The invention also keeps the temperature of the reaction zone to increase with height. This is accomplished by dividing with a partition means the fluidized bed of silicon particles into a heating zone and a reaction zone so that silicon particles of both zones being freely mixed above the heating zone by dense-phase fluidization by gas bubbles. The silicon particles in the heating zone are fluidized by a carrier gas that does not include a silicon source and is supplied through an independent gas distribution means, and are heated by the microwave supplied into the zone without heating the walls encompassing the zone. On the other hand, the silicon particles in the reaction zone are fluidized by a mixture of reaction gases that include a silicon source and are supplied through a separate gas distribution means. Solid mixing of silicon particles above the heating zone occurs easily and actively in the freely bubbling regime without intentional circulation of particles. Thus, the temperature difference between the zones is insignificant. The reaction temperature at the upper section of the reaction zone is maintained with the heat generated by microwaves in the heating zone, which is transferred by the continuous particle-particle mixing or contact and by the flow of carrier gas. No direct irradiation of microwaves into the reaction zone is required. The flow rate of the carrier gas must be sufficient not only maintain fluidizing the silicon particles exposed microwave in the heating zone but also to prevent substantial downward flow of the silicon source gas from the reaction zone. Thus, this invention improves the service factor for microwave heating by preventing deposition on the inner walls of the reactor through which microwaves are supplied. It is accordingly unnecessary to cool the CVD reactor by coolant injection outside the reactor walls in order to reduce wall deposition. Under the proposed conditions it is not necessary to additionally cool with a cooling fluid the gas distribution means for supplying the reaction gas because the temperature at the lower section of the reaction zone considerably lower than that at its upper section. Thins invention also provides an improved CVD reactor in which particle agglomeration is minimized or avoided, since the reaction occurs at the well fluidized reaction zone without unnecessarily hot surface area of silicon particles and without direct irradiation of microwaves. Therefore, this invention provides a fluidized bed reactor of improved thermal configuration for Greater energy efficiency as well as for enhanced stability in operation.

BRIEF DESCRIPTION OF THE DRAWINGS

The invention is hereinafter more fully described with reference to the accompanying schematic drawings, not to scale, wherein.

DESCRIPTION OF THE PREFERRED EMBODIMENTS

Figure 1:
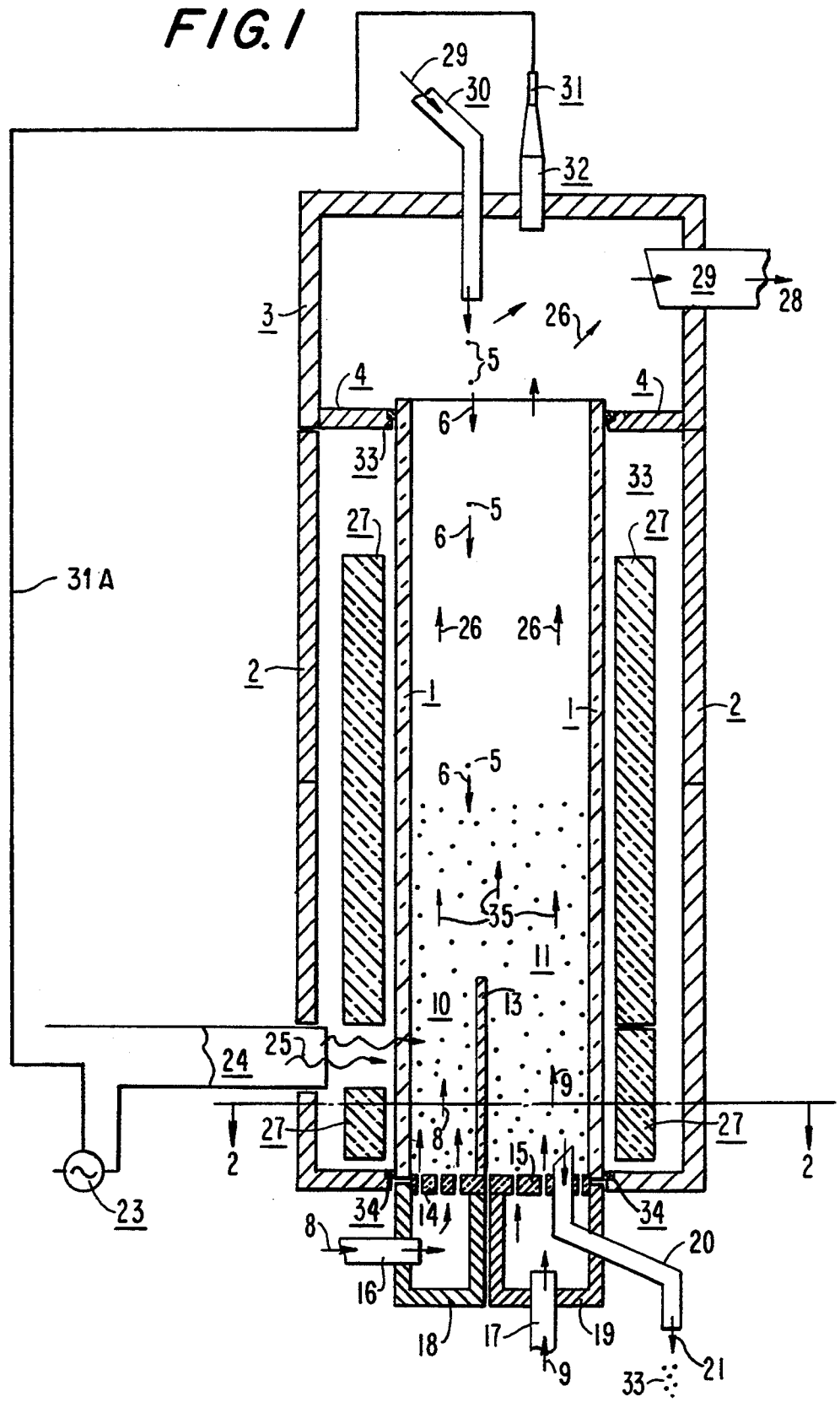
FIG. 1 illustrates an embodiment of a fluidized bed reactor according to one embodiment of the present invention.

FIG. 1 illustrates one embodiment of an apparatus for the preparation of high-purity polysilicon granules by the improved heating method for a fluidized bed reactor according to the present invention. A quartz reactor column 1 is installed in a microwave applicator 2 made of metal such as stainless steel that reflects microwave without loss. The upper portion of reactor is covered by an expanded zone 3 made of metal, and is fixed by a support plate 4 with a graphite-like gasket 33 in order to reduce the radial vibration of reactor 1 due to fluidization. Silicon seed particles 5 to be grown large by CVD reaction are supplied into reactor 1 through a seed particle inlet means 30. A hopper pressurized with an inert gas or reducing gas 29 is connected to the seed particle inlet means 30. Seed particles 5 introduced through inlet 30 fall by gravity into the lower portion of reactor 1. The quantity of seed particles 5 required to be present in reactor 1 for CVD operation can be readily determined by experiments. The lower end of reactor 1 is joined with applicator 2 by a graphite-like gasket 34, and the silicon particles contained within reactor 1 are supported by gas distribution means 14 and 15 that are made of silicon, quartz or silicon-lined material. Since quartz reactor is positioned within applicator 2 by graphite-like gaskets 4 and 34 at its both ends, it can thermally expand in axial and radial directions without breakage when heated during CVD operation.

The silicon bed in reactor 1 are separated by a partition means 13 to form a heating zone 10. The silicon particles in heating zone 10 are fluidized by a carrier gas or a reducing gas 8 such as hydrogen in which a silicon source is not included. Carrier gas 8 is supplied through a gas inlet means 16 and then through a gas distribution means 14 which is enclosed by a chamber 18 made of metal such as stainless steel or silicon-lined material. The silicon particles 11 in the other side of heating zone 10 are fluidized by reaction gas 9 including a silicon source. To control the concentration of silicon source in reactor 1, reaction gas 9 can also include a carrier gas or a reducing gas 8, if required, in addition to a silicon source. Reaction gas 9 is supplied through a gas inlet means 17 and then through a gas distribution means 15 which is enclosed by a chamber 19 made of metal such as stainless steel or silicon-lined material. The preheating of gas 9 is so limited as to prevent the decomposition of silicon source before introduction into reactor 1. Above the heating zone 10 both carrier gas 8 and reaction gas 9 are mixed with each other, and thus the silicon particles above partition means 13 are fluidized by mixed gas 35. Therefore, the silicon bed excluding heating zone 10 can be utilized as reaction zone 11 required for silicon deposition.

Microwave generator 23 converts electrical power to microwaves 25. Usually microwaves of 915 or 2450 MHz are generated, in the mode of either pulse waves or continuous waves, by commercially available microwave generators. Microwaves 25 generated travel through waveguide 24 connected to applicator 2, and then penetrate through the quartz wall at the side of heating zone 10. Waveguide 24 is normally made of a metal such as aluminum or brass for an efficient traveling of microwaves. Since silicon is a highly microwave-absorptive material and heating zone 10 is located just in front of the outlet of waveguide 24, the silicon particles fluidizing in heating zone 10 absorb most of microwaves 25 upon penetration without forming substantial electromagnetic fields at the other space within reactor 1 and applicator 2 except for heating zone 10. The silicon particles subject to the irradiation of microwaves 25 in heating zone 10 are heated by themselves following the instantaneous dissipation of the absorbed microwave energy as heat inside the silicon particles.

The rapid mixing of silicon particles is automatic and smooth in a fluidized state with gas bubbles, making it possible to transfer the vast quantities of heat generated in heating zone 10 to the upper section of reaction zone 11. Gas mixing of gas streams 8 and 9 at the section also provide the important function of rapid heat transfer from the heating zone to the reaction zone. Thus, the flow rate of carrier gas 8 should be sufficient one not only for the fluidization of the silicon particles in heating zone but also for the rapid mixing between heating zone 10 and reaction zone 11. Carrier gas 8 can be preheated up to the reaction temperature by a preheater and purified by a purifier before introduction into reactor 1. Considering energy efficiency and possible contamination of gas at high temperatures within the preheater, preheating carrier gas 8 up to the required reaction temperature is not desirable. The flow rate of reaction gas 9 should be sufficient to provide for the fluidization of the silicon particles in reaction zone 11 at the reaction temperature and can be readily determined by experiment. The silicon source in liquid phase is usually evaporated and then preheated before introduction into reactor 1. On the other hand, reaction gas 9 can also be supplied in the form of a gas-liquid mixture where fractions of silicon source are entrained as sprayed liquid droplets in evaporated silicon source and/or in a reducing gas such as hydrogen. Preheating of reaction gas 9 is limited below an incipient decomposition temperature of silicon source so as to prevent the decomposition of the silicon source onto the inner walls of gas inlet 9 and gas chamber 19 as well as onto gas distribution means 15. Being in contact with fluidizing silicon particles, gas distribution means 15 for reaction gas 9 is susceptible to being heated above the incipient decomposition temperature if reaction gas 9 is overheated, and then to being plugged due to silicon deposition. Therefore, the temperature of reaction gas 9 should be controlled during CVD operation not to be unnecessarily high, with gas distribution means 15 being maintained less than the incipient decomposition temperature. Corresponding to the limited temperature range of the gas streams introduced and the gas distribution means, the average velocities of uprising gas streams and the degree of fluidization at the bottom of the fluidized bed is lower than those at the main reaction zone. Thus, the silicon particles which have grown sufficiently larger than seed particles 5 tend to fall back into the bottom of the bed. They can then be withdrawn as product 21 in the form of polysilicon granule 33 through an outlet 20. The fluidized bed reactor may be operated for batch production or continuous production. If continuous production of the polysilicon granule is desired, the feed rate of seed particles 5 and the withdrawal rate of product 33 should be interrelated following a material balance equation based on the operation parameters for the fluidized bed system.

In addition to providing rapid particle mixing between heating zone 10 and reaction zone 11, the uprising gas stream 8 prevents the back flow of the silicon source from the reaction zone down into the heating zone, while the lateral penetration of the silicon source into heating zone 10 is also made impossible by the partition means 13. As gas stream 8 rises upwardly from distribution means 14, the gas expands and accelerates further due to the increase of temperature by directly mixing with the microwave heated silicon particles. Therefore, back flow of the silicon source into heating zone 10 can be prevented readily by those of skill in the art. This precludes the deposition of silicon within heating zone 10 and, especially, at the section of reactor walls through which microwaves are introduced. A fluidized bed reactor of the prior art does not have this capability since microwaves are introduced directly into reaction zone. Thus, silicon deposition at the inner walls of the reactor is an inevitable problem in the reaction zone. Microwaves would be supplied through the deposited silicon layer at the reactor walls in the prior art and thus, it is essential to cool the outer walls of the quartz reactor by the injection of cooling fluids outside the wall in order to reduce the degree of wall deposition.

Upon leaving heating zone 10, the carrier gas 8 mixes with the silicon source of reaction gas 9, and the mixture 35 is the main source of CVD reaction in the reaction zone. Although silicon deposition can also proceed by reaction gas alone at the lower section of reaction zone 11, the CVD reaction is more dominant at its upper section where temperatures of the gas mixture and silicon particles are sufficiently higher than those at its lower section. This is mainly attributed to the direct mixing of its upper section with heating zone 10 as well as to the sufficiently heated gas mixtures 35. Since chemical equilibrium of the CVD reaction is readily obtained even by several centimeters of bed height in a fluidization state at above 900° C in case of trichlorosilane, the CVD reaction is nearly finalized to an equilibrium state at the upper section of reaction zone vent gas mixtures 26, including the unreacted silicon source, byproduct gases and carrier gas exit the fluidized bed through the expanded zone and then through vent gas nozzle 29. The vent gas mixture 28 out of nozzle 29 is further treated for recovery and recycle which are beyond the scope of the present invention. The minimum bed height of the reaction zone for a required yield of silicon decomposition at a reaction temperature is readily determined by analyzing the chemical composition of vent gas 28.

Figure 2:
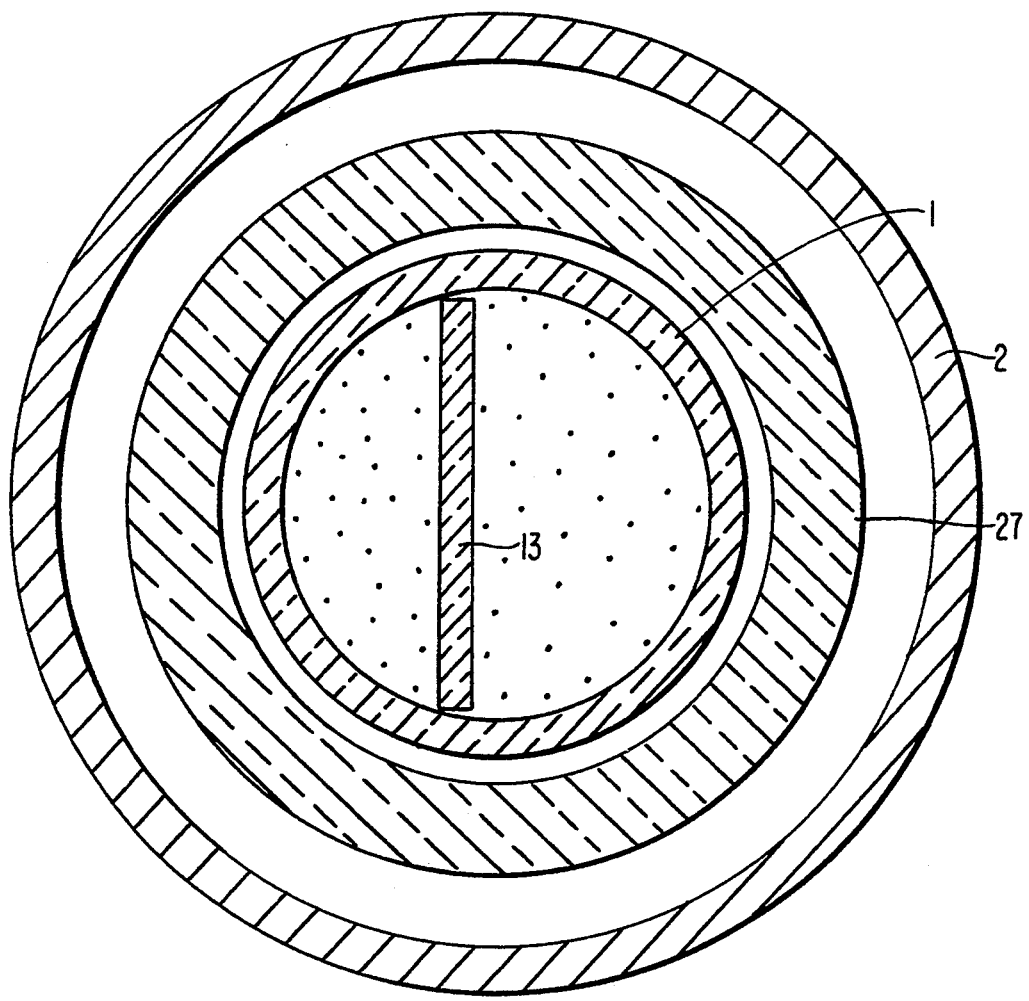
FIG. 2 is a cross sectional view taken along the line 2—2 in FIG. 1.

The heat generated in heating zone 10 by the irradiation of microwaves 25 covers the required heat for CVD reactions, sensible heat for uprising gases 8 and 9, and heat losses outside reactor 1 through the walls of applicator 2 and expanded zone 3. Although the first two heat energies are inherently necessary to CVD operation, the heat losses should be minimized for saving energy. In the present embodiment, heat losses through the walls of reactor 1 can be greatly reduced by installing insulating material 27 outside the reactor walls as shown in FIG. 2. Various inorganic materials with low thermal conductivity are available for the insulation. Around heating zone 10 where microwaves 25 penetrate, opaque quartz or high-purity fibrous silica is preferred to prevent the dissipation of microwave as heat within the insulating material. Heat losses directed downward from the fluidized bed can be readily picked up by uprising gas streams 8 and 9 at the bottom of the bed and can be utilized at least as a fraction of the heat required for preheating the gas streams. The power of microwave energy is controlled according to the temperature at reaction zone 11 which is measured by a detection means 31 connected to a nozzle 32 and to the microwave generator 23 as indicated at 31A.

Figure 3:
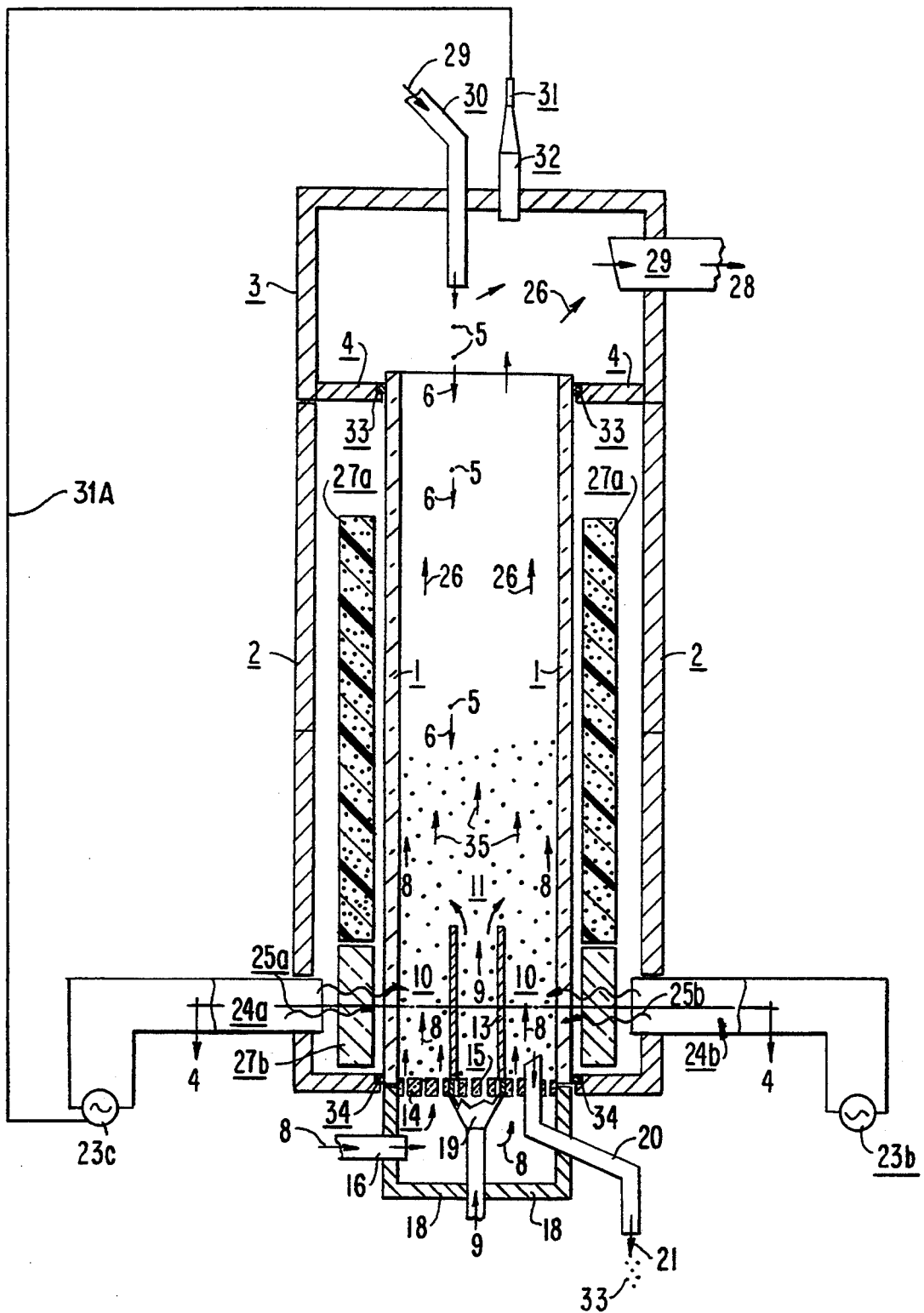
FIG. 3 illustrates another embodiment of a fluidized bed reactor according to the invention.

FIG. 3 illustrates another embodiment of a fluidized bed reactor according to the invention, where the heating zone is formed in the annular region at the lower section of the reactor bed. The same numerals as used in FIG. 1 are applied to the identical parts in this embodiment as those of the aforementioned embodiment.

Figure 4:
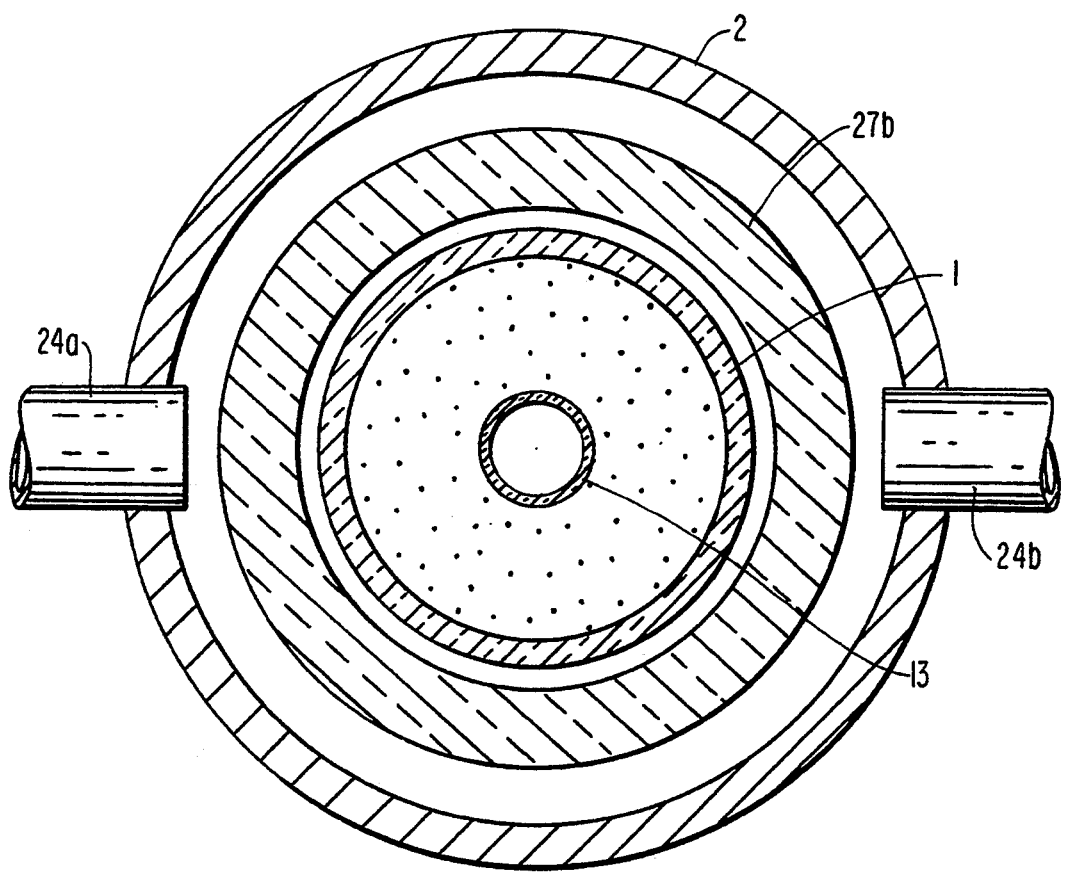
FIG. 4 is a cross sectional view taken along the line 4—4 in FIG. 3.

The lower section of the silicon bed in reactor 1 is divided into two zones by a partition means 13 made of high-purity material such as silicon, quartz or silicon-lined material. Reaction gas 9, which is introduced into the reactor bed from a separate gas distribution means 15, risers upwardly through partition means 13. An annular-type heating zone 10 is formed around the partition means as shown in FIG. 4. A carrier gas stream 8 is introduced through gas distribution means 14 and passes along the annular region while the lateral penetration of reaction gas 9 including silicon source is prevented by the partition means. Reaction zone 11 for CVD reaction is thereby formed in the silicon bed excluding the heating zone. The flow rates of carrier gas 8 and reaction gas 9 should be sufficient for silicon particles to fluidize in the two zones at the reaction temperature, respectively, as described in the aforementioned embodiment.

Heat required for the CVD operation is supplied by microwave heating at the heating zone with the reaction zone being heated indirectly by the heating zone. Silicon particles in heating zone 10 are heated by the irradiation of microwaves introduced through waveguides 24a and 24b and then through the reactor walls in front of the waveguides. In the present embodiment, two separate microwave generators 23a and 23b are used to convert electrical power to microwave 25a and 25b, respectively. Instead of using the two generators, the required microwave can also be generated by a single generator of higher capacity and can be supplied through a power dividing means which distributes the microwave generated evenly to the heating zone.

The silicon particles and the carrier gas, both of which are heated zone heating zone 10, mix with those in reaction zone 11 rapidly and smoothly in a fluidized state mainly above the upper end of the annular region of the heating zone. The solid mixing is a natural outcome of the mixing of fluidizing gas streams 8 and 9. This mixing dominates the indirect heating of the reaction zone by the direct heating of the heating zone by microwaves, although the heat transfer mechanism of solid-solid radiation is also appreciable in the high-temperature reactor system. Thus, the temperature of the reactor walls in contact with reaction zone 11 is less than that at the silicon particles in heating zone 10. Furthermore, although gas streams 8 and 9 mix with each other above the annular heating zone, the concentration of silicon source in mixed gas stream 35 is the lowest near the inner walls of reactor 1 because considerable carrier gas 8 still rises upwardly along the inner walls in spite of its mixing with reaction gas mainly in the axial part of the reaction zone. Therefore, the silicon deposition at the reactor walls in contact with the reaction zone is not significant. On the other hand, silicon decomposition is dominant on the surfaces of silicon particles in the reaction zone by mixed gas stream 35 including the silicon source whose concentration should be the highest in the axial part and changes in height according to the CVD reaction. The grown particles, i.e., product polysilicon granules 33, are withdrawn through a product withdrawal means 20 while gas stream mixture 26 leaves the reactor bed through vent gas nozzle 29.

The flow rates of gas streams, especially that of the carrier gas, should be controlled for efficient heat transfer from heating zone 10 to reaction zone 11. As in the aforementioned embodiment, a minimum flow rate of carrier gas 8 should be determined to prevent the back flow of silicon source into heating zone 10 from reaction zone 11. The minimum flow rate can be readily determined by analyzing gas samples out of the annular heating zone. Thus, any silicon deposition inside the reactor walls through which microwave 25a and 25b penetrate can be prevented. It is notable that, in a deep enough bed of small silicon particles, excessive gas flow rates can lead to a slugging state of silicon particles where gas bubbles coalesce and grow as they rise and become large enough to spread across the cross-section of the reactor column. The bed slugging greatly reduces the efficiency of mixing and chemical reaction, which can be readily determined by measuring the temperature at the both zones and the chemical composition of the mixed gas stream 26 that exits the fluidized bed. The flow rate of carrier gas 8 is thus controlled at least to overcome the back flow of silicon source with the slugging state being prevented.

To save energy by reducing heat loss through the reactor walls, an insulation material can be installed between the applicator wall 2 and the reactor 1. Insulation 25b around the heating zone should be made of various forms of material having low absorptivity of microwaves such as high-purity silica. Insulation 27a outside the reactor other than the heating zone can be selected among conventionally available insulation materials in addition to the silica material. Various forms of the materials are applicable here including felt, wool, woven fabrics, tube, foam and brick.

The present invention includes several features as follows which distinguish it over prior art methods and systems used for preparing polysilicon granules:

(1) Unlike prior art CVD reactors heated by microwaves, no direct irradiation of microwaves into the reaction zone of the fluidized bed reactor is required in the present apparatus to maintain the CVD operation. The temperature of the particles at the upper section of reaction zone 11 is arranged to be maintained stable mainly by the heat transferred upwardly from heating zone 10. The apparatus by the present invention makes fully use of the characteristics that heat flows in parallel with the direction of a fluid flow, i.e., the carrier gas in the heating zone, and that the rapid equalization of temperature between the two zones is easily obtained by solid-solid and gas-solid mixing within a fluidized bed with gas bubbles. Hence, the reaction temperature can be maintained by the microwave heating without the deposition of silicon onto the inner walls of the reactor through which microwaves are supplied. Also, formation of HCl, $SiCl_2$ and polymeric byproducts in the reaction zone, which are unfavorable natural outcomes from high-temperature Si-H-Cl system, is minimized because there cannot be any hot spot in the reaction zone.

(2) In contrast to the prior art fluidized bed reactors recirculating silicon particles through the heating zone, the present apparatus precludes a massive downward flow of silicon particles through a heating zone which accompany a silicon source from a reaction zone. Introducing a sufficient flow rate of uprising carrier gas 8 into the heating zone is allowed is the present process to prevent a back flow of reaction gas 9. On the other hand, in those prior art reactors, its flow rate is limited to maintain an incipient fluidized state with silicon particles accompanying a silicon source from the reaction zone and passing downwardly through the heating zone. Therefore, this apparatus can prevent the silicon deposition at the outer walls of the heating zone more safely than the prior art reactors, and allows the microwave heating through the walls. Due to active fluidization and to the prevention of silicon deposition in heating zone 10, silicon particles which are exposed to microwave irradiation are essentially free from the problem of agglomeration. Even in reaction zone 11, silicon particles are also free from agglomeration because there cannot be locally overheated spot and both the carrier gas and reaction gases fluidize them vigorously.

(3) The present invention removes the basic requirement of previous recirculating fluidized bed reactors that high heat flux should be applied to a fluidized bed in a region close to the cooled distributor where a large amount of heat loss is inevitably present. This important advantage is obtained from the temperature profile formed within the reaction zone. While the upper section of the reaction zone maintains a required reaction temperature by the upward heat transfer from the heating zone, there is no direct heat transfer from the heating zone to the lower section near the gas distribution means for reaction gases. In addition, uprising reaction gases behaves like a coolant fluid for cooling its distribution means and nearby particles. Since its inlet temperature should be significantly lower than the reaction temperature, the temperature at the bottom section of the reaction zone can be kept low enough to prevent the formation of crusts due to accumulated silicon deposition at the distribution means. Therefore, any additional cooling of the distributor is not required and the heat flux from the upper section of the reaction zone is utilized to preheat the uprising reaction gases above the distributor. On the other hands, considering the high reaction rate of deposition in a fluidized bed reactor, the reaction gases can approach an equilibrium state at the upper section of the reaction zone before leaving the fluidized bed. Hence, the present apparatus increases the efficiency of deposition and provides for improved conversion of the silicon source into solid silicon.

(4) No cooling of the reactor walls by injecting cooling fluids outside the walls, through which microwaves are supplied, is required in the present invention to prevent wall deposition of silicon. Introducing an additional coolant fluid into the gas distribution means in contact with the heating zone is also unnecessary because downward back flow of a silicon source is prevented in the present method. Consequently, heat losses through the reactor walls and the gas distribution means are greatly reduced by the present method.

(5) Unlike prior art fluidized bed reactors, insulating around the reactor walls and supplying microwave through the insulation material is possible in the present apparatus. Since the reactor walls encompassing the heating zone are essentially free from wall deposition, heat loss from the zone by radiation and convection can easily be prevented by installing microwave-transparent insulation material around the reactor walls. Thus, the heat generated by microwaves in the heating zone can efficiently be utilized for the CVD reaction in the reaction zone. This greatly reduces the losses of energy from the high-temperature system, with the power of microwave energy required being minimized. Therefore, the present invention enhances the efficiency and safety of microwave heating, and prevents operational problems, such as the formation of high-voltage arc and difficulties in impedance matching that are related to high microwave power. The applicability of insulation thermally isolates the mechanical parts of applicator 2 and waveguide 24 from the high-temperature reactor bed. This leads to less limitation in the design, material selection and fabrication of the apparatus as well as to more stability in operation.

Processes for the preparation of high-purity polysilicon granules according to the present invention are exemplified below.

EXAMPLE 1

Two series of CVD operations were conducted utilizing trichlorosilane (TCS) as a silicon source to test the effectiveness of this invention in comparison with a conventional microwave heating method.

In the first series of CVD operations to test the present invention, a tubular quartz reactor of 104 mm ID, 3 mm thick and 1,060 mm height was installed inside the applicator 2 of FIG. 1. A rectangular partition plate made of quartz with 80 mm (W) ×200 mm (H) ×5 mm (T) was installed at the bottom of the reactor 1 to divide the reactor bed into a heating zone 10 and a reaction zone 11. About 3.5 kg of silicon particles having a size range of 177–590 microns and an average size of 335 microns were supplied into the reactor to form a bed of silicon particles. Based on the multi-hole gas distribution plates 14 and 15, the bed height was between 300–360 mm. Microwave with the frequency of 2,450 MHz was introduced from a rectangular waveguide 24, which was connected to the applicator, into the lower portion of the heating zone. Surrounding the quartz reactor, an insulation block of 20 mm thickness made of high-purity silica was installed between the reactor wall and the inner wall of the applicator. For this process, typical operating conditions were:

| (1) Carrier Gas (Hydrogen) | |
| --- | --- |
| feed rate | 0.53 mol/min |
| preheat temperature of gas in | 350° C. |
| (2) Reaction Gases: Trichlorosilane(TCS) and Hydrogen | |
| feed rate of TCS | 0.35 mol/min |
| feed rate of Hydrogen | 0.45 mol/min |
| preheat temperature of gas in | 100° C. |
| (3) CVD Reaction Temperature | 960° C. |
| (4) Reaction Pressure | atmospheric |

The operations were executed in a continuous manner by consecutive additional supplying of seed particles 5 into the reactor bed and withdrawal of product granules 33 out of the bed while maintaining the bed weight and particle size range constant.

When operating in this manner, 1,104 grams of net silicon deposition was obtained over 10 hours of CVD operation. 3.2 KW and 4.3 KW of microwave power were required to maintain the preset CVD temperature before introducing TCS and during CVD operation with feeding TCS, respectively. Temperatures at the gas distribution plates for the carrier gas and the reaction gases were observed to be maintained at 625° C. and 342° C., respectively, during the CVD operation. After the CVD operation, silicon deposition at the reactor walls encompassing the heating zone was not found and the quartz reactor was free of local crack or deformation. The formation of silicon layer or crust on the gas distribution plate for the reaction gases could be prevented due to the temperature at the plate which was maintained less that the incipient decomposition temperature of about 400° C. In the product granules and residual silicon particles within the reactor after the operation, there was no agglomeration, sintering or cluster of silicon particles. Also, no silicon deposition at the gas distribution plate for introducing the reaction gases was observed.

In the second series of CVD operations to test the conventional microwave heating method, the above-mentioned apparatus for the first series of operations was used with several modification as follows. The partition plate was removed from the reactor bed, and thus all the silicon bed was utilized as a reaction zone without a separate heating zone. The insulation block was also removed for cooling by nitrogen gas the outer walls of the quartz reactor to minimize the silicon deposition at its inner walls. At the bottom end of the applicator 2, a gas inlet nozzle and a multi-hole distributor for injecting the cooling gas were installed. The cooling gas was vented out through holes made at the support plate 4 in FIG. 1. Two gas inlet nozzles, 16 and 17, and separate gas chambers, 18 and 19, were modified for introducing preheated reaction gas 9 evenly through the gas distribution plates 14 and 15. For this conventional process, the supply of microwaves and operating conditions were the same as the first series of tests except that the same feed rates of the carrier gas and the reaction gases were mixed together and preheated to 150° C. Further, the feed rates of nitrogen gas for the wall cooling and cooling water for the distributor cooling were 8.5 mol/min and 9.0 liter/min, respectively.

When operating in this conventional manner, more microwave power was required to maintain the same bed temperature as in the first test for the present invention. It is a natural result following the cooling around the reactor bed instead of using insulation. 6.1 KW and 7.6 KW of microwave power were required to maintain the CVD temperature before and after introducing TCS in the feed gas, respectively. However, after the introduction of TCS in the reaction gases, a gradual increase of the power from 7.6 up to 9.0 KW was required to maintain the temperature. Furthermore, the pressure drop at the gas distribution plate increased with time. Hence, continuous CVD operation more than 4 hours at maximum was impossible. The increase of the microwave power required was mainly because of the silicon deposition at the inner walls of the quartz reactor through which microwaves were introduced. In spite of the gas cooling of the outer walls of the quartz reactor, the inner walls in contact with microwave irradiated particles were subject silicon deposition due to locally high wall temperature. As the thickness of the deposited silicon layer at the wall increases, the layer also absorbs part of the microwave supplied, leading to the increase of microwave power to maintain the predetermined reaction temperature. When the apparatus was disassembled after stopping the CVD operation striped stains of melted silicon layer glued with several agglomerated silicon particles were observed on the reactor walls facing the outlet of waveguide 24. Among 3,920 grams of the total product including 420 grams of net silicon deposition, more than 120 grams of silicon particles were found to agglomerate with each other within the reactor bed, which is believed to be related to local hot spots near the stains. In addition, a crust of silicon particles glued with each other by silicon deposition covered a half of the gas distribution plate in contact with the reaction zone. Thus, the increase of the pressure drop at the gas distribution plate was revealed to be directly related to the formation of the crust on the gas distribution plate. Although the temperature beneath the water-cooled gas distribution plate was measured to be less than 400° C., the incipient decomposition temperature of TCS, its surfaces in contact with hot silicon particles should be locally overheated above the temperature. This naturally leads to the accumulation of silicon deposition, the plugging of holes in the distribution plate, the decrease in the degree of fluidization near the plugged holes, agglomeration of microwave-heated hot silicon particles onto the deposited layer, and finally to an accelerated growth of the crust. Although the formation of the crust could be decreased with reduced preheat temperature of the reaction gas as well as with more enhanced cooling of the gas distribution plate by circulating additional cooling water inside, the problem could not completely avoided as long as microwave heated silicon particles contact the distribution plate through which TCS is flowing. Following subsequent CVD operations with other operating conditions, there were no significant changes in these problems of wall deposition and crust, inefficiency and unstableness in CVD operations by the conventional microwave heating method.

EXAMPLE 2

As another illustration of the present invention, a tubular quartz reactor 1 of 204 mm ID, 4.5 mm thick and 1700 mm height was installed inside the applicator 2 of FIG. 3. A tubular partition column 13 made of quartz tube of 80 (ID) ×350 mm (H) ×5 mm (T) was installed at the bottom the reactor to divide the reactor bed into a heating zone 10 and a reaction zone 11. For feeding reaction gas 9 to the reaction zone 11 gas distribution nozzle 15 of 20 mm I.D. was installed, with its end being located inside the lower partition column 13. About 33 kg of silicon particles having a size range of 297–1000 microns and an average size of 647 microns were supplied into the reactor to form a bed of silicon particles. Based on the multi-hole gas distribution plates 14 for carrier gas, the bed height was between 700–800 mm. Microwave with the frequency of 915 MHz was introduced from two same rectangular waveguides 24a and 24b of FIG. 3, which were connected to the applicator, into the annular heating zone 10. Surrounding the quartz reactor, insulation blocks 27a and 27b of 20 mm thickness made of high-purity silica was installed between the reactor 1 and the inner wall of the applicator 2.

For the process, typical operating conditions were:

| | | |
|---|---|---|
| (1) Carrier Gas (Hydrogen) | | |
| feed rate | 4.0 mol/min | |
| preheat temperature of gas in | 250° C. | |
| (2) Reaction Gases: Trichlorosilane(TCS) and Hydrogen | | |
| feed rate of TCS | 3.1 mol/min | |
| feed rate of Hydrogen | 6.0 mol/min | |
| preheat temperature of gas in | 100° C. | |
| (3) CVD Reaction Temperature | 930° C. | |
| (4) Reaction Pressure | atmospheric | |

The operations were executed in a continuous manner by consecutive additional supplying of seed particles 5 into the reactor bed and withdrawal of product granules 33 out of the bed while maintaining the bed weight and particle size range constant.

When operating in this manner by the present invention, 30.4 kg of net silicon deposition was obtained over a 30 hours of CVD operation. 17 KW and 28 KW of microwave power were required to maintain the preset CVD temperature before introducing TCS and during CVD operation with feeding TCS, respectively. Temperatures at the gas distribution plates for the carrier gas and the reaction gases were observed to be maintained at 585° C. and 318° C., respectively, during the CVD operation. After the CVD operation silicon deposition at the reactor walls encompassing the heating zone was not found and the quartz reactor was free of local cracks or deformation. Also, the formation of silicon layer or crust was not found on the gas distribution plate for the reaction gases. In the product granules and residual silicon particles within the reactor after the operation, there was no agglomeration, sintering or cluster of silicon particles.

Although the present invention has been fully described by way of example with reference to accompanying drawings, is to be understood that various changes and modifications will be apparent to those skilled in the art. Therefore, unless such changes and modifications depart from the scope of the invention, they should be construed as being included therein.

What we claim is:

1. Apparatus for preparing polycrystalline silicon comprising:

a fluidized bed reactor means;

means for introducing silicon particles into said reaction means;

partition means in said reactor means partitioning said reactor means into a reaction zone and a heating zone having an open upper end, said partition means precluding fluid communication and lateral penetration of silicon particles between said heating zone and said reaction zone other than through said oepn upper end of said heating zone;

first inlet means for introducing a reaction gas comprising a silicon source material into said reaction zone and for fluidizing silicon particles in said reaction zone such that said silicon source material is deposited as silicon metal on said silicon particles at a reaction temperature;

second inlet means for introducing a carrier gas into said heating zone and for fluidizing said silicon particles in said heating zone;

heating means for heating said silicon particles by microwave energy in said heating zone to a temperature above said reaction temperature such that said heated silicon particles in the upper section of said heating zone are mixed with said silicon particles in said reaction zone to thereby transfer the heat of said heated silicon particles in said heating zone to said reaction zone;

insulating means juxtaposed to said heating zone, said insulating means comprising microwave-transparent insulating material;

first outlet means on said reactor means for removing said silicon particles on which said silicon source material has been deposited; and second outlet means on said reactor means for removing unreacted fluidizing gases and reaction by-product gases from said reactor means.

2. Apparatus for preparing polycrystalline silicon comprising:

a fluidized bed reactor means;

means for introducing silicon particles into reaction means;

partition means in said reactor means partitioning said reactor means into a reaction zone and a heating zone having an open upper end, said partition means precluding fluid communication and lateral penetration of silicon particles between said heating zone and said reaction zone other than through said open upper end of said heating zone;

first inlet means for introducing a reaction gas comprising a silicon source material into said reaction zone and for fluidizing silicon particles in said reaction zone such that said silicon source material is deposited as silicon metal on said silicon particles at a reaction temperature;

second inlet means for introducing a carrier gas into said heating zone and for fluidizing said silicon particles in said heating zone;

heating means for heating said silicon particles by microwave energy in said heating zone to a temperature above said reaction temperature such that said heated silicon particles in the upper section of said heating zone are mixed with said silicon particles in said reaction zone to thereby transfer the heat of said heated silicon particles in said heating zone to said reaction zone;

said reactor means comprising a reactor vessel surrounded by containing means, said containing means being spaced from said reactor vessel to form a space about said reactor vessel, and insulating means within said space;

first outlet means on said reactor means for removing said silicon particles on which said silicon source material has been deposited; and second outlet means on said reactor means for removing unreacted fluidizing gases and reaction by-product gases from said reactor means.

3. A fluidized bed reactor in which a reaction gas comprising a source material is in a fluidized-bed relationship with seed particles on which said source material is to be deposited, comprising;

a fluidized-bed reactor vessel means having a first inlet means for said reaction gas and a second inlet means for seed particles;

partition means in said vessel means partitioning said vessel means into a heating zone and an operating zone, said heating zone having an open upper end, said partition means precluding fluid communication and lateral penetration of silicon particles between said heating zone and said operating zone other than through said open upper end of said heating zone;

said operating zone constituting a reaction zone in which there is a fluidized-bed relationship between said seed particles and said reaction gas;

said vessel means having third inlet means for introducing a carrier gas into said heating zone;

microwave heating means disposed externally of said heating zone operable to heat said heating zone;

said open upper end of said heating zone being in open communication with said operating zone;

insulating means between said heating zone and said heating means, said insulating means between said heating zone and said heating means constituting a first insulating means, and further comprising a second insulating means externally of said vessel means, said first insulating material having an absorptivity of microwaves which is lower than that of said second insulating material;

first outlet means on said vessel means for removing said seed particles in which said source material has been deposited; and second outlet means on said vessel means for removing fluidizing gases and reaction by-product gases from said vessel means.

4. A fluidized bed reactor in which a reaction gas comprising a source material is in a fluidized-bed relationship with seed particles on which said source material is to be deposited, comprising;

a fluidized-bed reactor vessel means having a first inlet means for said reaction gas and a second inlet means for seed particles;

partition means in said vessel means partitioning said vessel means into a heating zone and an operating zone, said heating zone having an open upper end, said partition means precluding fluid communication and lateral penetration of silicon particles between said heating zone and said operating zone other than through said open upper end of said heating zone;

said operating zone constituting a reaction zone in which there is a fluidized-bed relationship between said seed particles and said reaction gas;

said vessel means having third inlet means for introducing a carrier gas into said heating zone;

microwave heating means disposed externally of said heating zone operable to heat said heating zone;

said open upper end of said heating zone being in open communication with said operating zone;

containing means disposed about said vessel means, said containing means being spaced from said vessel means to form a space between said vessel means and said containing means, first insulating means disposed in one part of said space between said containing means and said lower section of said vessel means, and second insulating means disposed in another part of said space between said containing means and said vessel means;

first outlet means on said vessel means for removing said seed particles in which said source material has been deposited; and second outlet means on said vessel means for removing fluidizing gases and reaction by-product gases from said vessel means.

5. A fluidized bed reactor in which a reaction gas comprising a source material is in a fluidized-bed relationship with seed particles on which said source material is to be deposited, comprising;

a fluidized-bed reactor vessel means having a first inlet means for said reaction gas and a second inlet means for seed particles;

partition means in said vessel means partitioning said vessel means into a heating zone and an operating zone, said heating zone having an open upper end, said partition means precluding fluid communication lateral penetration of silicon particles between said heating zone and said operating zone other than through said open upper end of said heating zone;

said operating zone constituting a reaction zone in which there is a fluidized-bed relationship between said seed particles and said reaction gas;

said vessel means having third inlet means for introducing a carrier gas into said heating zone;

microwave heating means disposed externally of said heating zone operable to heat said heating zone;

said open upper end of said heating zone being in open communication with said operating zone;

said vessel means comprising a vessel wall portion which defines a part of said heating zone, said microwave heating means comprising a wave guide means juxtaposed to said vessel wall portion such that microwaves generated by said microwave heating means penetrate said vessel wall portion;

first outlet means on said vessel means for removing said seed particles in which said source material has been deposited; and second outlet means on said vessel means for removing fluidizing gases and reaction by-product gases from said vessel means.

6. An apparatus according to claim 2 wherein said insulating means comprises a first insulating material juxtaposed to said reaction zone and a second insulating material juxtaposed to said heating zone and having an absorptivity of microwaves which is lower than that of said first insulating material.

7. A fluidized bed reactor according to claim 4 wherein said containing means has an upper part and a lower part respectively juxtaposed to and facing an upper part and a lower part of said vessel means, and gasket means between said facing upper parts and between said facing lower parts.

* * * * *